June 10, 1969     E. G. SUKUP     3,448,966
VERTICAL AUGER STABILIZING APPARATUS
Filed Dec. 19, 1967     Sheet 1 of 2

INVENTOR
EUGENE G. SUKUP
BY
ATTORNEY

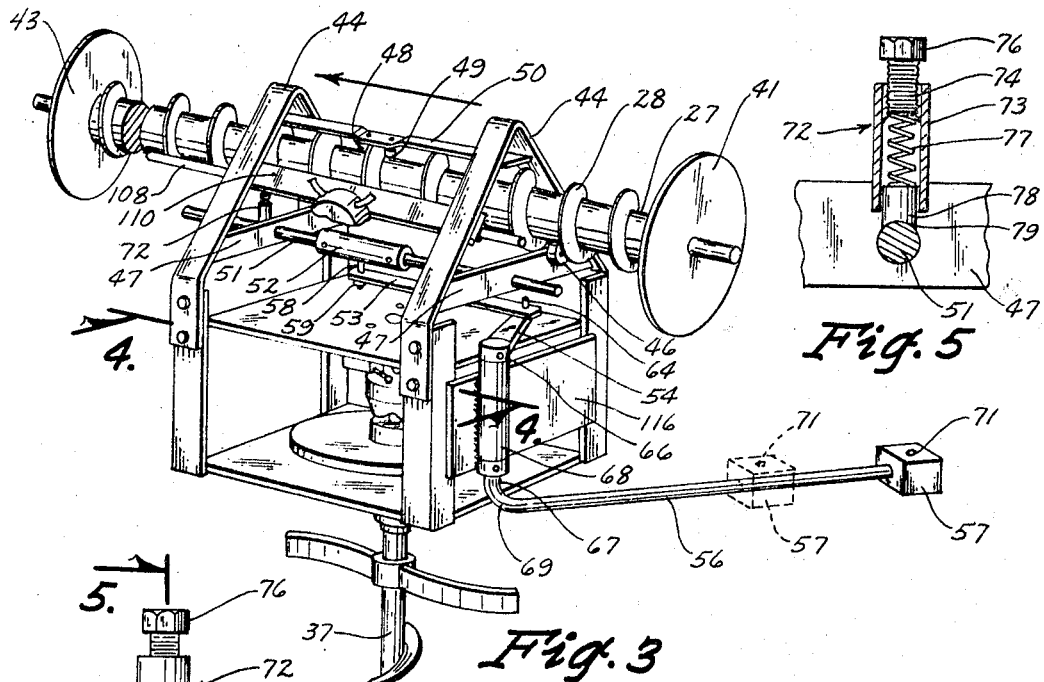
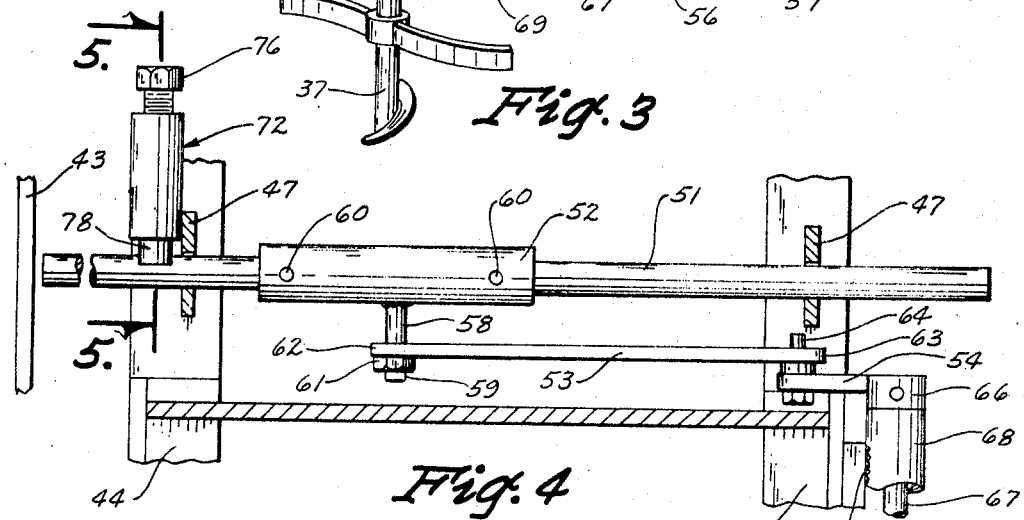
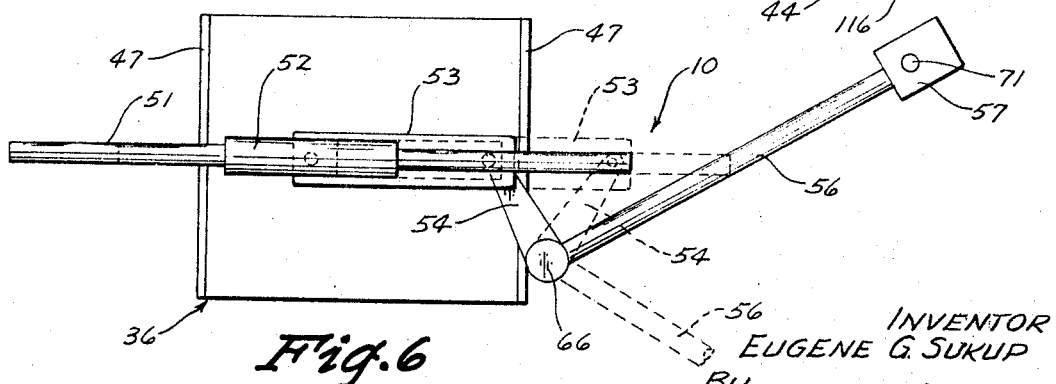

United States Patent Office

3,448,966
Patented June 10, 1969

3,448,966
VERTICAL AUGER STABILIZING APPARATUS
Eugene G. Sukup, Sheffield, Iowa 50475
Filed Dec. 19, 1967, Ser. No. 691,841
Int. Cl. B01f 7/08, 7/24
U.S. Cl. 259—111   6 Claims

ABSTRACT OF THE DISCLOSURE

This invention relates to a pivotal weight apparatus arcuately swingable about a frame unit from which a vertically dependent, rotating auger is suspended, the frame unit being mounted on and arcuately swingable about a rotatable, horizontally disposed shaft, the weight apparatus automatically countering the pendulum swing of the rotating shaft transmitted to the frame unit.

Background of the invention

This invention finds its use in a grain moving apparatus for aerating stored grain such as described in Patent No. 3,272,480, employing a rotating auger suspended from a frame unit and arcuately swingable upon an overhead rotating conveyor unit. The dependent auger in operation will vary from 5–10° from the vertical line when aerating such heavy crops as corn or beans but in lighter crops such as rice, the auger will depart from the above mentioned tolerable variance. The free swinging movement of the auger is desired to prevent undue stress upon the auger; however, when the variance from the vertical is too great, the effectiveness of the aerating apparatus is hindered. This invention will eliminate the undesired variance from the vertical position of the auger in all crops, yet prevent undue stress upon the auger by permitting the auger to still swing arcuately.

Summary of the invention

It is an object of this invention to provide an apparatus capable of stabilizing the vertical movement of a vertically suspended auger device radially movable on a horizontally disposed means that is reciprocal and effective regardless of the direction of movement of the auger.

It is a further object of this invention to provide a vertical stabilizing device for a vertically suspended auger device rotatably mounted on a horizontally disposed means which will counter the "climbing effect" of the rotating dependent auger.

It is still another object of this invention to provide a vertical stabilizing apparatus for a vertically suspended auger device which, while dampening the swinging tendency of the device, will not rigidly fix the device so as to create undue stress upon the auger.

It is yet another object of the invention to provide a vertical stabilizing device that is easily adaptable for use with existing grain aerating devices having a vertical dependent auger rotatably mounted on a horizontally disposed conveyor.

It is a further object of this invention to provide an apparatus capable of attaining the above designated objectives, which apparatus is economical to manufacture, simple and rugged in structure, and effective in operation.

These objects and other features and advantages of this invention will become readily apparent upon reference to the following description, when taken in conjunction with the accompanying drawings.

Brief description of the drawings

FIG. 3 is a fragmentary perspective view of the invention in relation to the frame and horizontal conveyor units;

FIG. 4 is a sectional view as taken along the line 4—4 of FIG. 3;

FIG. 5 is a sectional view of the brake as taken along the line 5—5 of FIG. 4;

FIG. 6 is a plan view of the elements of FIG. 3, showing alternate positions of said elements by the use of full and dotted lines.

Description of the preferred embodiment

Figure 1:
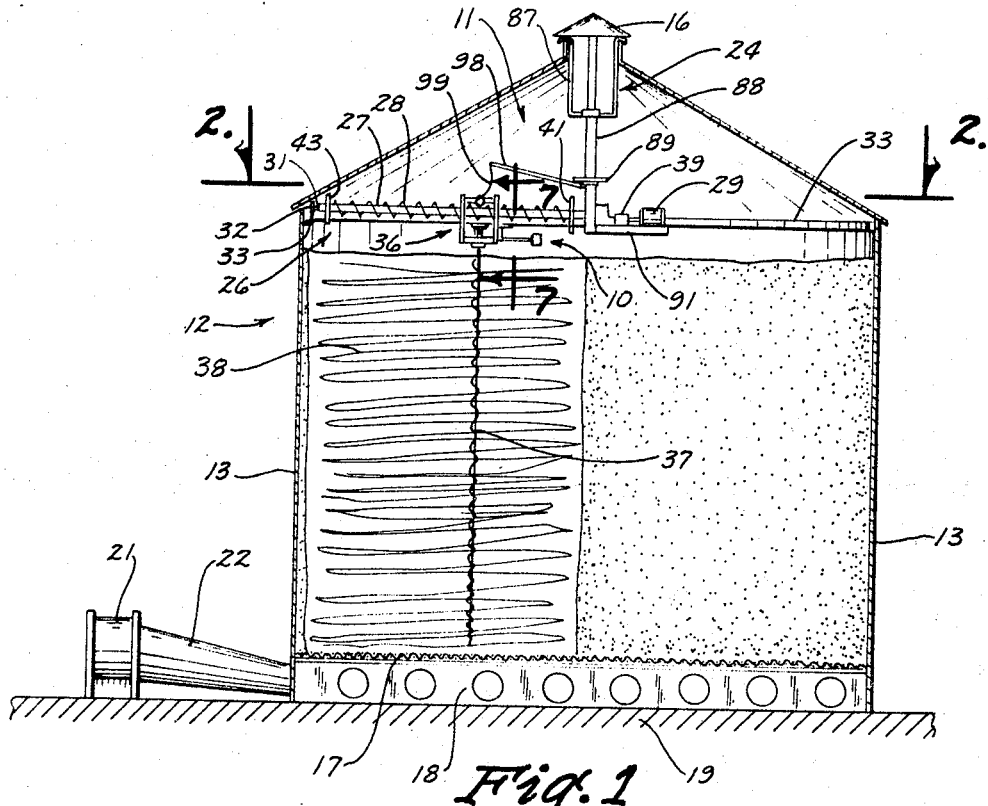
FIG. 1 is a sectional view of a conventional grain bin, showing the apparatus of this invention attached to a grain aerating apparatus mounted therein.

Referring now to the drawings and particularly to FIG. 1, the vertical stabilizing device of this invention is indicated generally at 10 and is shown in assembled relation with a grain moving and leveling apparatus 11 within a conventional grain bin 12.

The bin 12 comprises a circular sidewall 13 of galvanized steel having an umbrella-type roof 14 supported thereon which roof 14 is provided with a ventilator cover 16. At the bottom of the grain bin 12, a circular perforated drying floor 17 is provided mounted on a steel understructure which includes a plurality of floor channels 18. The grain bin 12 as a whole is mounted on a concrete foundation 19.

A fan 21 is mounted on a portion of the foundation 19, and upon operation forces air through a transition unit 22 beneath the perforated floor 17.

Generally, the grain moving and leveling apparatus 11 comprises a support unit 24 (FIG. 1) attached to the roof 14; a conveyor unit 26 mounted on the support unit 24 and rotatable in a circular direction thereabout, the unit 26 including a horizontally disposed auger shaft 27 having helical flighting 28, and a reversible motor 29 therefor; a friction clutch 31 having a wheel 32 attached thereto which is connected to the auger shaft 27; a circular track 33 for receiving the wheel 32 and mounted on a plurality of brackets 34 (FIG. 2) secured about the wall 13; a frame unit 36 (FIGS. 1 and 3) rotatably mounted on the auger shaft 27 so as to be simultaneously movable longitudinally of and circularly about the shaft 27; and a vertically disposed auger 37 (FIGS. 1 and 3) operably connected to the frame unit 36 and depending into the grain 38 for tumbling same, upon rotation of the auger 37, upwardly due to the flighting of the auger 37.

More specifically, the support unit 24 comprises a plurality of strap fasteners 87 (FIG. 1) the upper ends of which hook over the open upper edge portions of the cover 16. A bracket 88 depends centrally from the fasteners 87 and has a bushing device 89 at its lower end. The underside of the device 89 rotates horizontally 360° about the upper side thereof, and from the underside of which an L-shaped structure 91 depends.

Mounter on the upper horizontal side of the structure 91 is the reversible motor 29 (FIG. 2) the power shaft 92 of which extends into a gear box 39. The inner end 94 of the auger shaft 27 extends through a pair of bearing blocks 96 and 97 mounted on the structure 91, and extends further into the gear box 39. Electric power is provided to the motor 29 and to a swivel switch mounted below the device 89. A rotatable boom 98 suspends an electric cable 99 to the frame unit 36 for supplying electricity thereto at all times during operation of the apparatus 11, and provides a means of electrically connecting the frame unit 36 to the motor 29 for reasons described hereinafter.

The conveyor unit 26 comprises the auger shaft 27, motor 29, gear box 39, and includes further an inner disc or plate 41 (FIGS. 1 and 3) secured to the shaft 27 adjacent the structure 91, and an outer plate 43 secured to the shaft 27 adjacent the slip clutch 31. The clutch 31 is of a conventional type which effects a rotation of the wheel 32 in a given, constant direction in response to rotation of the shaft 27 in one direction, but which does not transmit rotation to the wheel 32 in response to rotation of the shaft 27 in the opposite direction.

Figures 2, 7:
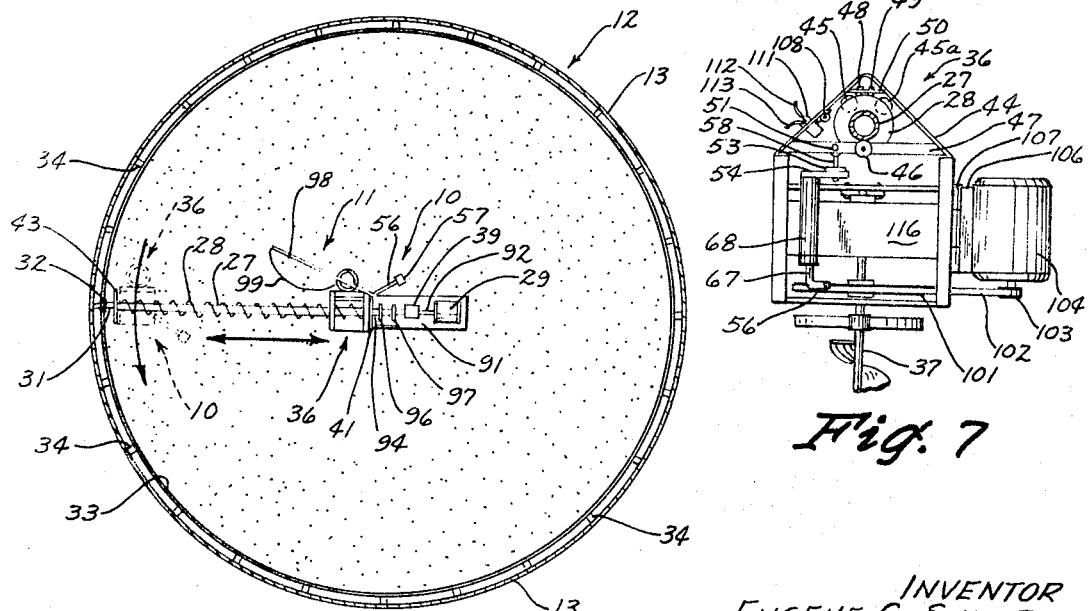
FIG. 2 is a plan view of the apparatus of FIG. 1 taken along the line 2—2 in FIG. 1.
FIG. 7 is a reduced sectional view as taken along the line 7—7 in FIG. 1.

Thus, in response to operation of the motor 29 to rotate the auger shaft 27 in a predetermined direction of rotation, the rotation of the shaft 27 is ransmitted by the clutch 31 to the wheel 32; and by virtue of a frictional grip of the wheel 32 on the track 33, the entire conveyor unit 26 and the support structure 91 rotate circularly about the bin 12 in a direction indicated by the curved arrow in FIG. 2. Then, should the direction of the motor 29 be reversed, the conveyor unit 26 and support structure 91 do not rotate circularly until the motor 29 is reversed again back to its original direction of drive.

The frame unit 36 is supported upon the auger shaft 27 (FIG. 3) by a pair of laterally spaced, parallel rollers 45 and 45a mounted on each of the two triangular shaped supports 44 of the frame unit 36, the peripheral edges of the rollers being in frictional engagement with the surface of the auger shaft 27 between the flighting 28 thereof. The two rollers 45 and 45a form a three point contact with the shaft 27 by the addition of a third roller 46 (FIG. 3) mounted on a horizontally disposed member 47 of each triangular support 44. The frame unit 36 is thereby rotatably mounted upon the shaft 27 and could actually rotate 360° about the longitudinal axis of the shaft 27.

To provide for longitudinal movement of the frame unit 36 on the shaft 27 in response to rotation of the shaft 27 (See the double arrow, FIG. 2), a pair of longitudinally spaced rollers 48 and 49 (FIG. 3) are provided, which rollers 48 and 49 are rotatable about vertical axes. The rollers 48 and 49, mounted on a plate 50 extended between the supports 44, are spaced so that upon rotation of the auger shaft 27 in one direction (see the arrow, FIG. 3) one roller, 48, for example, would be frictionally engaged by the flighting 28, whereby the frame unit 36 would be pushed along the shaft 27. Conversely, upon a rotation of the shaft 27 in an opposite direction, the other roller 49 would be engaged by the flighting 28 and the frame unit 36 would be pushed in the other direction.

Referring to FIG. 7, it is noted that the vertical auger 37 is rotated via the pulley wheel 101 by a belt 102 driven by the drive wheel 103 of a motor 104 secured to a mounting plate 106. The mounting plate 106 is hingedly connected at 107 to the supports 44 and is adjustable for maintaining proper tension on the belt 102.

To effect a reversal of the motor 29 (FIG. 1) when the frame unit 36 reaches the outer end of the auger shaft 27 so that the frame unit is then moved backwardly toward the inner end 94 (FIG. 2) of the shaft 27, and vice versa, a reciprocal mechanism is provided on the frame unit 36. This mechanism comprises an elongated rod 108 (FIGS. 3 and 7) extended parallel to the shaft 27 and reciprocally movably mounted in a guide 109 mounted on a plate 110 secured between the supports 44.

Also mounted on the plate 110 is an electric switch device 111 connected by leads 112 and 113 to the source of electricity, and to the motor 29. The switch device 111 is operably connected to the bar 108 such that when the bar 108 strikes the plate 43, for example, upon further movement of the frame unit 36 toward the plate 43 the rod 108 will be moved sufficiently to effect a change of the switch device 111 whereby the direction of rotation of the motor 29 is reversed. This effects a reversed direction of rotation of the shaft 27 such that the frame unit 36 is carried back toward the inner plate 41.

When the rod 108 strikes the plate 41, and is then moved due to continued movement of the frame unit 36 toward the plate 41, the switch device 111 is again changed to change the direction of rotation of the motor 29 whereby the shaft 27 carries the frame unit 36 back toward the outer plate 43. During the reciprocation of the frame unit 36 on the shaft 27, simultaneous operation of the motor 104 effects a continued rotation in one direction of the depending auger 37.

As explained more in detail in U.S. Patent No. 3,272,480, simultaneous operation of both motors 29 and 104 as described hereinbefore causes the auger 37 to have a curved path, in plan view, as the frame unit 36 is moved outwardly from the center of the bin 12; but due to the operation of the slip clutch 31 disengaging the frictional drive wheel 32 from the shaft 27, upon movement of the frame unit 36 inwardly toward the center of the bin and the inner end 94 of the shaft 27, the conveyor unit 26, including the shaft 27, does not rotate arcuately about the bin, but remains stationary with the shaft 27 rotating in place such that the path of the vertical auger 37 is a straight, radial path as the frame unit 36 moves inwardly.

The vertical stabilizing device 11 (FIG. 3) comprises generally a reciprocal shaft 51 including an adjustable collar 52, a link 53 connecting a pivot arm 54 to the collar 52, the pivot arm 54 in turn operably attached to an L-shaped weight bar 56 supporting a weight 57.

The reciprocal shaft 51 (FIG. 3) comprises an elongated round shaft extending parallel to the auger shaft 27 and reciprocally mounted in a pair of members 47 attached to the triangular supports 44. Within the frame unit 36, the shaft 51 (FIG. 4) is inserted through the cylindrical collar 52. The collar 52 is adjustable longitudinally anywhere upon the shaft 51 and after positioning is firmly attached thereto by Allen screws 60. Extending perpendicularly from the collar 52 is a short rod 58 threaded at one end 59 to receive a nut 61 to secure one end 62 of the link 53, which end 62 is provided with a hole (not shown) to receive the rod 58 snugly but freely.

The opposite end 63 of the strap 53 also receives a vertical rod 64 extending from the horizontally disposed pivot arm 54. The pivot arm end 66 is capped to receive and firmly attach to the vertical portion 67 (FIG. 4) of the weight bar 56 extending through a vertically disposed cylindrical hub 68 attached to the frame unit 36 by a plate 116. As seen in FIG. 6, the pivot arm 54 is attached to the vertical portion 67 of the weight bar 56 in such a manner that the arm 54 extends substantially at right angles to the bar 56 (FIGS. 3 and 6). Included within the hub 68 are bearings (not shown) to permit the bar 67 to turn freely within the hub 68.

The weight bar 56 is a heavy elongated bar bent near one end at a 90° angle 69 to allow one portion 67 to serve as an axle when inserted through the hub 68 attached to the frame unit 36. The horizontal portion of the bar 56 is inserted into a heavy metallic weight 57, which weight 57 may be positioned anywhere along the longitudinal axis of the bar 56 as best illustrated in FIG. 3 and then securely attached by means of a set screw 71. The weight 57 serves as a balance or counterweight to react against the tendency of the vertical auger 37 (FIG. 1) to thread its way off of the vertical course when rotating within the grain 38.

Movement of the reciprocal shaft 51 to the right as illustrated by the broken lines in FIG. 6 moves the attached collar 52 in a clockwise direction, pushing the link 53 along with the pivot arm to the right. This in turn swings the weight bar 56 clockwise arcuately to the opposite side of the frame unit 36, relative to the shaft 27, and offsets the center of balance of the frame 36 and the depending auger 37.

The force required to move the reciprocal bar 51 to the right is supplied by the movement of the frame 36 along the longitudinal axis of the shaft 27 as hereinbefore described, after the bar 51 has struck the disc 43 and while the bar 51 is held stationary by the outer disc 43 (FIG.

4). Upon reversal of the motor 29 due to movement of the bar 108 the frame 36 reverses its direction of movement, and operation of the stabilizing apparatus 10 is again effected back to its original position as shown in FIGS. 2 and 6 in full lines. This operation occurs due to the bar 51 striking and being moved to the left (FIG. 6) by the inner plate 41. Thus the pivot arm 54 and the weight bar 56 are both swung counterclockwise as viewed in FIG. 6 and the weight 57 is on the opposite or trailing side of the frame unit 36, relative to the shaft 27 and its arcuate direction of movement.

To prevent the weight bar 56 from swinging freely while the frame unit 36 is moving along the longitudinal axis of the shaft 27, a friction brake is provided. (FIGS. 3 and 4). The brake 72 is comprised of a cylindrical body 73 (FIG. 5) secured as by welding to the brace 47, and threaded internally at the upper end 74 for receiving a bolt 76. Within the cylinder 73 and contacted by the threaded bolt 76 is a spiral spring 77 adapted to exert pressure upon a dowel 78 concave at one end 79 to permit full line contact with the reciprocal shaft 51. The pressure of the plug 78 upon the shaft 51 may be regulated by turning the bolt 76, and which pressure is ample to retard any independent reciprocal movement of the shaft 51 and in turn any independent pivoting of the weight bar 56.

Referring to FIG. 2, it is seen that the weight 57 and its weight arm 56 extend to the rear and on the trailing side of the shaft 27 when the frame unit 36 is at its innermost position. Thus, any tendency of the vertical auger 37 (FIG. 1) to lean forward or in the direction of movement of the conveyor unit 26, as indicated by the arrow in FIG. 2, is tended to be overcome and stabilized by the position of the weight arm 56 as illustrated in FIG. 2.

It will be noted that the illustrated position of the weight 57 and arm 56 in FIG. 2 remains in the same position during movement of the frame unit 36 outwardly along the shaft 27, again tending to stabilize and prevent any forward leaning of the vertical auger 37. Then, as described hereinbefore, when the frame unit 36 reaches the outer end of the shaft 27, the stabilizing apparatus 10 is affected such that the weight 57 and weight arm 56 are moved forwardly so as to be on the side of the shaft 27 toward the direction of movement of same. The positions of these elements are shown by the use of dotted lines in FIG. 2.

Thus, when the frame unit 36 is at the outer end of the shaft 27, any tendency of the vertical auger 37 to swing to the rear or to trail to the rear of the shaft 27 and away from its arcuate direction of movement is tended to be prevented by operation of the stabilizing apparatus 10. Again, during movement of the frame unit 36 inwardly of the shaft 27, the stabilizing apparatus 10 remains in its forward position, still tending to prevent the vertical auger 37 from swinging toward a trailing position.

I claim:
1. In a grain moving apparatus for operation within a walled enclosure, the apparatus including a frame unit movable radially back and forth on a horizontally disposed, radially extended conveyor unit mounted in the enclosure for arcuate movement about a point, the frame unit freely suspended and swingable arcuately about the conveyor unit and having an auger depending therefrom for rotation about a vertical axis, an apparatus for stabilizing the frame unit about its normal center of gravity comprising in combination:
control bar means mounted on the frame unit and operatively movable to a first position in response to the frame unit reaching one end of the conveyor unit, and operatively movable to a second position in response to the frame unit reaching another end of the conveyor unit;
weighted means movably mounted on the frame unit and including a weight movable in plan view from one side of the conveyor unit to the other, the position of said weight on either side of the conveyor unit operable to shift the center of gravity of the frame unit; and
linkage means interconnected between said control bar means and said weighted means for causing movement of said weight to one side or the other side of the conveyor unit in response to movement of said control bar means from said first position to said second position.

2. A stabilizing apparatus as defined in claim 1, and further wherein said control bar means includes a member reciprocally mounted for movement in a direction parallel to the direction of movement of the frame unit.

3. A stabilizing apparatus as defined in claim 2, and further wherein said linkage means includes a collar adjustably mounted on said member, and a pair of pivotally connected links connected between said collar and said weighted means and operable to move said weighted means in response to movement of said member.

4. A stabilizing apparatus as defined in claim 1, and further wherein said weighted means includes an elongated member swingably connected to the frame unit for movement in a horizontal plane, said weight adjustably mounted on said member.

5. A stabilizing apparatus as defined in claim 4, and further wherein said weight is movable from one side of the center of gravity of the frame unit to the other side of the center of gravity thereof in response to movement of said control bar member from its first position to its second position.

6. A stabilizing apparatus as defined in claim 1, and further wherein brake means are mounted on the frame unit for frictional engagement with said control bar means for reducing the responsiveness of said control bar means.

References Cited
UNITED STATES PATENTS

| | | | |
|---|---|---|---|
| 3,156,541 | 11/1964 | Kalke | 259—111 X |
| 3,198,493 | 8/1965 | Sukup | 259—111 |
| 3,251,582 | 5/1966 | Murphy | 259—111 |
| 3,272,480 | 9/1966 | Sukup | 259—111 |

ROBERT W. JENKINS, *Primary Examiner.*